March 19, 1929.    J. N. PEPIN    1,705,677
BRAKE MECHANISM
Filed Dec. 18, 1925    4 Sheets-Sheet 3

Inventor
Joseph N. Pepin
By Hill & Hill
Attys

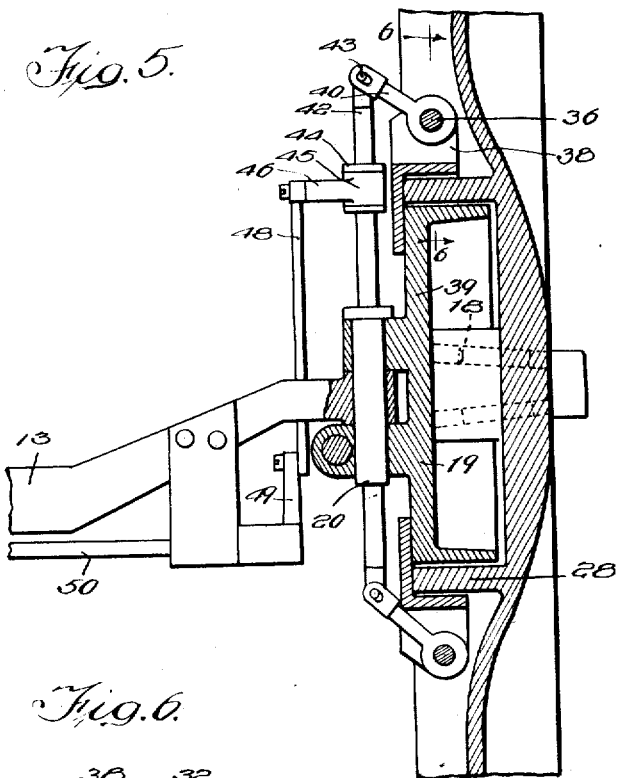

Patented Mar. 19, 1929.

1,705,677

UNITED STATES PATENT OFFICE.

JOSEPH N. PEPIN, OF CHICAGO, ILLINOIS, ASSIGNOR TO NATHAN E. ALEXANDER, OF CHICAGO, ILLINOIS.

BRAKE MECHANISM.

Application filed December 18, 1925. Serial No. 76,226.

My invention relates to brake mechanism and has among its other objects the production of simplified brake mechanism, which is convenient, compact, durable, efficient and satisfactory for use wherever found applicable.

A particular object of the invention is to provide improved brake mechanism which may be applied to the steering wheels of an automobile as well as to the rear wheels thereof.

Another particular object of the invention is to provide improved brake mechanism wherein one brake element will not effectively engage or drag upon a cooperating brake element unless the brake mechanism is positively actuated.

One form of the invention is embodied in brake mechanism applied to the front and rear wheels of an automobile, each front wheel having a brake drum which is constrained to rotate with it and is engageable by a pair of brake members or bands. The brake members or bands carry nuts adjustably mounted upon screw-threaded pins. Each screw-threaded pin is connected to a pin slidably journaled in a knuckle pin associated with the wheel, the slidably journaled pin being connected to a foot pedal which may be depressed to displace the slidably journaled pin in such manner that the screw-threaded pins are rotated to move the brake bands into engagement with the brake drum. Each of the rear wheels of the automobile is provided with brake mechanism which is operatively connected with the foot pedal and resembles the brake mechanism provided upon the front wheels. In the brake mechanism applied to the rear wheels, however, the slidably journaled pins are replaced by pins which are bent intermediate their ends to avoid the rear axle.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 5 is a section taken on line 5—5 of Fig. 3;

Fig. 6 is a section taken on line 6—6 of Fig. 5;

Fig. 7 is a fragmentary end elevation of the apparatus shown in Fig. 6;

Fig. 8 is a section taken on line 8—8 of Fig. 4;

Fig. 9 is an enlarged perspective view of a dog forming part of my improved brake mechanism; and Fig. 10 is an enlarged perspective view of a nut forming part of my improved brake mechanism.

Figure 1:
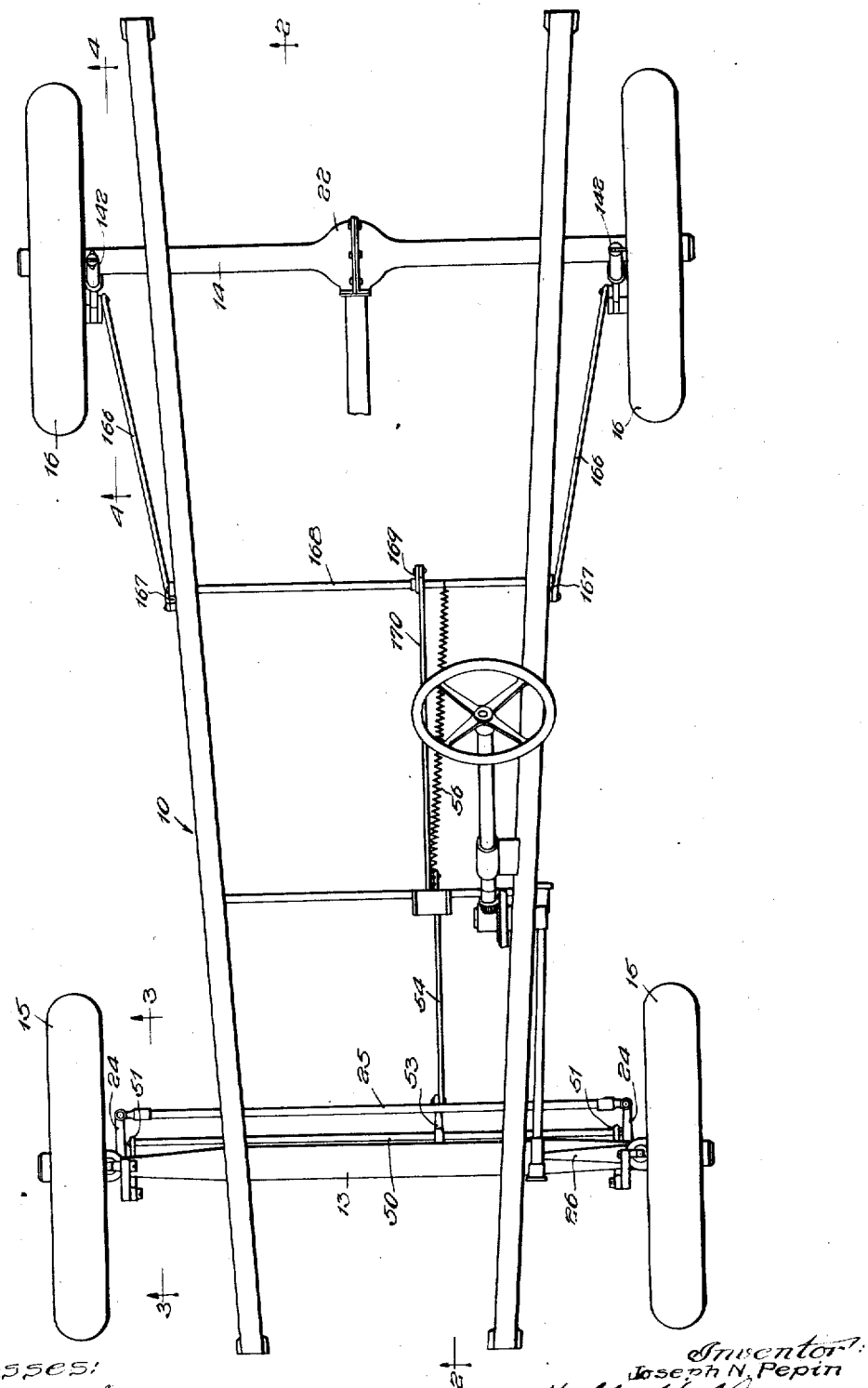
Fig. 1 is a plan view of the chassis of an automobile, brake mechanism embodying the invention being shown in connection therewith.
Figure 2:
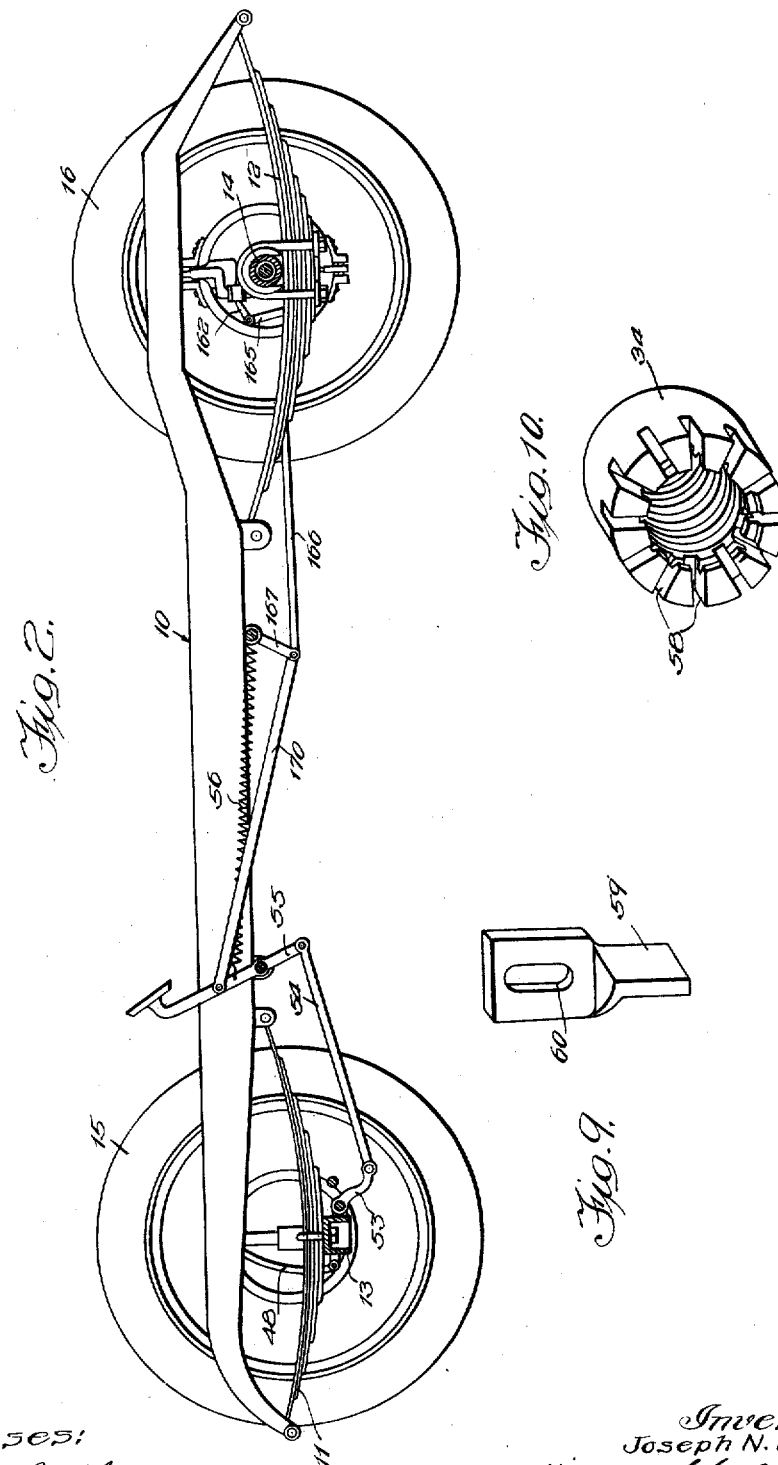
Fig. 2 is a section taken on line 2—2 of Fig. 1.

Referring for the present to Figs. 1 and 2, wherein I have shown an automobile chassis having brake mechanism which embodies a preferred form of the invention, the reference character 10 designates generally the frame of the chassis, which is provided with the usual front and rear springs 11 and 12, respectively, the frame 10 and the springs 11 and 12 being of any well-known or desired construction.

Secured to the springs 11 and 12 are front and rear axles 13 and 14, respectively, the front axle 13 being provided with the usual steering wheels 15 and the rear axle 14 being provided with the usual driving wheels 16. In the illustrated embodiment of the invention the steering wheels 15 are rotatably journaled upon steering spindles 18 projecting from steering knuckles 19 which are pivoted to the front axle 13 by knuckle pins 20. The steering knuckles 19 are provided with steering arms 24 connected to each other by the usual tie-bar 25, the left hand steering knuckle 20 being also provided with a drag link arm 26 forming part of the steering apparatus. The rear wheels 16 are driven from a differential 22 by conventional mechanism which does not form a part of this invention.

Figure 3:
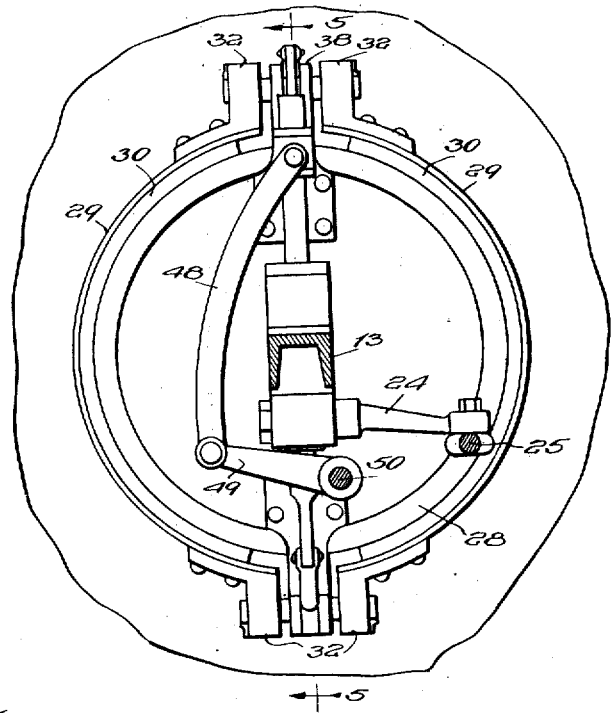
Fig. 3 is a section taken on line 3—3 of Fig. 1.
Figure 4:
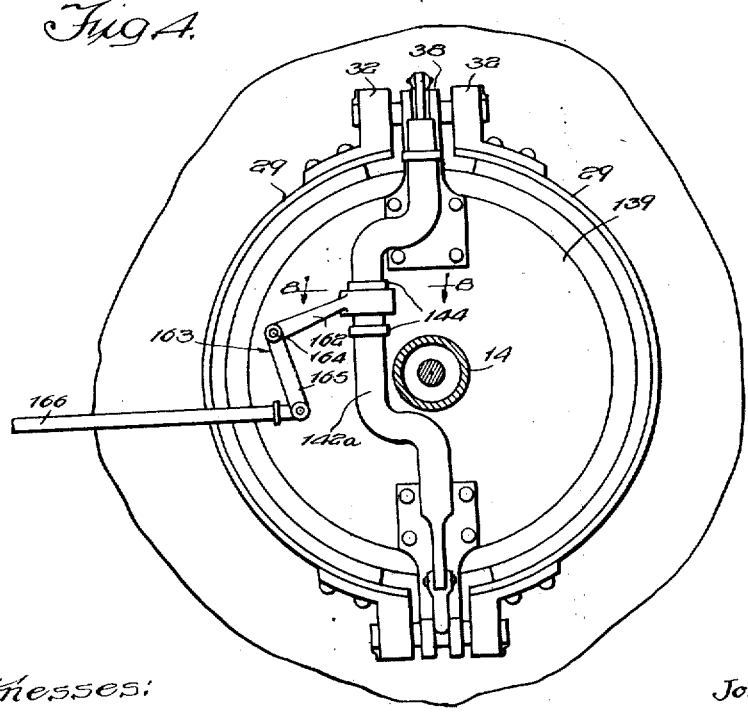
Fig. 4 is a section taken on line 4—4 of Fig. 1.

As best shown in Figs. 3 and 5, each front wheel 15 is provided with a brake drum 28 which cooperates with a pair of diametrically disposed brake members or bands 29, each brake member 29 being provided with a friction lining 30 engageable with the brake drum 28. Secured to each end of each of the brake members 29 is a bracket 32 formed with a recess 33 in which a substantially cylindrical nut 34 is seated, the nuts associated with one of the brake members being formed with right hand internal screw-threads and the nuts associated with the other brake member being formed with left hand internal screw threads. It will be noted that the nuts 34 associated with adjacent ends of the brake members 29 are disposed in coaxial alignment and that the nuts are threaded upon a pin 36 provided with left and right hand screw-threads. Obviously, the pins 36 may be rotated to displace the nuts 34 toward or away from each other. Each pin 36 is rotatably journaled in a bifurcated bracket 38 carried by a flange 39 which may be formed integral with the steering knuckle 19. Levers 40 secured to the pins 36 intermediate their ends have their free ends pivoted to a pin 42, as indicated at 43, the pin 42 being slidably journaled in a bore extending longitudinally through the knuckle pin 20. The pin 42 is preferably provided with spaced collars 44 between which a hub 45 of a lever 46 is held. Pivoted to the lever 46 is a link 48 which operatively connects the lever 46 to a lever 49 rigidly secured to a shaft 50 extending transversely of the frame 10, the shaft 50 being rotatably journaled in bearings 51 mounted upon the front axle 13. Rigidly secured to the shaft 50 intermediate its ends is a lever 53 which is connected by a link 54 to a foot pedal 55 normally held in its retracted position by a spring 56.

It will be noted that the brake mechanism provided for the right hand wheel 15 is substantially identical with the brake mechanism provided for the left hand wheel 15, the brake mechanism for each of these wheels being operable by the foot pedal 55, which, when depressed, will rotate the shaft 50 in a counter-clockwise direction (Figs. 2 and 3) to draw the pins 42 downward through the medium of the levers 49 and links 48. The construction is such that when the pins 42 are drawn downward, the pins 36 will be rotated in a proper direction to have each pair of aligned nuts 34 approach each other. Obviously, when the nuts 34 are caused to approach each other, the brake members for each brake 28 carry their friction linings 30 into engagement with the drum. When the foot pedal 55 is released, the spring 56 restores the several parts of the brake mechanism to their functionally inoperative positions.

Means is provided for locking the nuts 34 in adjusted positions with respect to the pins 36. Thus, each nut 34 is formed with a plurality of radial slots 58 engageable by a dog 59 movably mounted upon the associated bracket 32, the dog 59 being slotted as at 60 to accommodate a bolt or screw 61 projecting from the bracket. It is readily understood that the dog 59 may be moved away from its associated nut 34 so that the nut may be brought into an adjusted position upon its pin 36 after which the dog 59 may be moved into engagement with one of the slots 58 to secure the nut in its adjusted position. This construction permits the brake mechanism to be readily adjusted for wear or to suit the driver.

The rear wheels 16 are provided with brake mechanism having parts which are substantially identical to parts of the brake mechanism associated with the front wheels. These parts of the brake mechanism for the rear wheels are identified by reference numerals 128, 129, 130, etc., the last two digits of each of these reference numerals being the reference numeral applied to the like part in the brake mechanism for the front wheels. However, it will be noted that the pins 142 are not slidably journaled in knuckle pins and that they are bent or offset intermediate their ends as indicated at 142ª to avoid the rear axle 14. Each pin 142 is provided with spaced collars 144 between which the free end of an arm 162 forming part of a bell crank lever 163 is arranged, the arm 162 being slotted as at 163ª (see Fig. 8) to accommodate the pin 142ª. The collars 144 are spaced apart a distance which is greater than the thickness of the free end of the arm 162 so that the rear springs 12 may function without actuating the brake mechanism. The bell crank lever 163 is pivoted to a flange 139 by a pin 164, the flange 139 being formed integral with or secured to the rear axle 14. The bell crank lever 163 comprises an arm 165 which is connected by a link 166 to one of a pair of levers 167 secured to a shaft 168 arranged transversely of the frame 10. Secured to the shaft 168 is a lever 169 which is connected by a link 170 to the foot pedal 55. It will be readily understood that the brake mechanism associated with the rear wheels 16 is actuated each time that the pedal 55 is depressed and that the braking effort is distributed over the several braking elements associated with the front and rear wheels 15 and 16, respectively.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. The combination with a rotatable member, of brake mechanism comprising a brake drum carried thereby, a plurality of brake elements held against rotation, adjustable means carried by said plurality of brake elements, means having screw-threads engaging said carried means, means for rotating said screw-threaded means to bring said plurality of brake elements into engagement with the brake drum, and means for retaining said carried means in a plurality of adjusted positions relative to said brake elements and said screw-threaded means.

2. In a vehicle, an axle, a steering knuckle, a knuckle pin for pivotally securing said steering knuckle to said axle, a wheel rotatably journaled by said steering knuckle, a brake drum constrained to rotate with said wheel, a plurality of said brake elements movable relatively to each other and held against rotation relative to said steering knuckle, a pin slidably journaled in said knuckle pin, means operatively connecting one end of said slidably journaled pin with each of said brake elements, means operatively connecting the other end of said slidably journaled pin with each of said brake elements, and means for displacing said pin to cause relative movement between said brake elements and said brake drum.

3. In a vehicle, an axle, a steering knuckle, a knuckle pin for pivotally securing the steering knuckle to the axle, a wheel rotatably journaled upon said steering knuckle, a brake drum constrained to rotate with said wheel, a plurality of brake elements movable relative to each other and held against rotation relative to said steering knuckle, a plurality of screw-threaded pins for operatively connecting said brake elements to each other, a pin slidably journaled in said knuckle pin, means for operatively connecting one end of said slidably journaled pin with one of said screw-threaded pins, means for connecting the other end of said slidably journaled pin with the other of said screw-threaded pins, and means for displacing the slidably journaled pin to cause relative movement between said brake elements and said brake drum.

4. In a vehicle, an axle, a steering knuckle, a knuckle pin for pivotally securing the steering knuckle to the axle, a wheel rotatably journaled upon said steering knuckle, a brake drum constrained to rotate with said wheel, a plurality of brake elements movable relative to each other and held against rotation relative to said steering knuckle, nuts carried by said brake elements, a plurality of pins screw-threaded in said nuts, a pin slidably journaled in said knuckle pin for operatively connecting one end of said slidably journaled pin with one of said screw-threaded pins, and means for operatively connecting the other end of said slidably journaled pin with the other of said screw-threaded pins, and means for displacing said slidably journaled pin.

5. The combination with a rotatable member, of brake mechanism comprising a brake drum, brake elements held against rotation, screw-threaded means for bringing said brake elements into engagement with the drum, longitudinally movable pins having operative connection with said screw-threaded means, and actuating means having operative connection with said pins whereby to rotate said screw-threaded means.

6. The combination with a rotatable member, a brake mechanism comprising a brake drum, brake elements held against rotation, screw-threaded means for bringing said brake elements into engagement with the drum, pins movable transversely of the first mentioned element and having operative connection with the screw-threaded means, and operating mechanism having connection with the pins whereby to impart movement to the same for rotating said screw-threaded means.

7. In a device of the character described and in combination, a rotatable element, a brake drum carried thereby and rotatable with the element, brake shoes oppositely positioned relative to the drum for movement into contact with the drum, means adjustably connecting the ends of the brake shoes whereby to move them toward and away from the drum, a pin movable longitudinally of the drum and having operative connection with said connecting means, and means whereby to impart movement to said pin for actuating said adjustable connecting means.

8. In a device of the character described and in combination, a rotatable element, a brake drum carried thereby, oppositely disposed brake shoes positioned adjacent the drum for engagement therewith, oppositely disposed brackets carried by the ends of said shoes, nuts carried by said brackets, one of said nuts being internally threaded in a direction opposite the other nut at opposite sides of the brake drum, a screw-threaded member having adjustable connection with said nuts whereby to move the shoes toward and away from the brake drum, a pin movable transversely of the drum and having operative connection with the screw-threaded member, and acuating mechanism having connection with the pin for imparting movement thereto whereby to move said shoes toward and away from the drum.

9. In combination with a plurality of rotatable elements, of a brake drum carried by each element, brake shoes for engagement with each of said drums, means adjustably connecting the ends of the brake shoes whereby to move them toward and away from their respective drums, pins movable transversely of the drums and having operative connection with the adjustable connecting means, and actuating mechanism having connection with said pins whereby to simultaneously actuate said pins for adjusting the brake shoes relative to each drum simultaneously.

10. The combination with a plurality of rotatable elements, of a brake drum carried by each element, brake shoes for engagement with each of said drums, nuts carried by the ends of the brake shoes, means connecting the nuts at each end of the shoes, said nuts being adjustable independent of the connecting means, means movable transversely of the drums and having operative connection with the connecting means, and actuating mechanism having connection with said last means whereby to simultaneously actuate said last means for adjusting the brake shoes relative to each drum simultaneously.

In testimony whereof, I have hereunto signed my name.

JOSEPH N. PEPIN.

CERTIFICATE OF CORRECTION.

Patent No. 1,705,677.     Granted March 19, 1929, to

JOSEPH N. PEPIN.

It is hereby certified that error appears in the printed specification of the above numbered patent requiring correction as follows: Page 3, lines 79 and 80, claim 6, strike out the words "first mentioned element" and insert instead the word "drum"; and that the said Letters Patent should be read with this correction therein that the same may conform to the record of the case in the Patent Office.

Signed and sealed this 7th day of May, A. D. 1929.

(Seal)

M. J. Moore,
Acting Commissioner of Patents.

tatable elements, of a brake drum carried by each element, brake shoes for engagement with each of said drums, nuts carried by the ends of the brake shoes, means connecting the nuts at each end of the shoes, said nuts being adjustable independent of the connecting means, means movable transversely of the drums and having operative connection with the connecting means, and actuating mechanism having connection with said last means whereby to simultaneously actuate said last means for adjusting the brake shoes relative to each drum simultaneously.

In testimony whereof, I have hereunto signed my name.

JOSEPH N. PEPIN.

CERTIFICATE OF CORRECTION.

Patent No. 1,705,677.            Granted March 19, 1929, to

JOSEPH N. PEPIN.

It is hereby certified that error appears in the printed specification of the above numbered patent requiring correction as follows: Page 3, lines 79 and 80, claim 6, strike out the words "first mentioned element" and insert instead the word "drum"; and that the said Letters Patent should be read with this correction therein that the same may conform to the record of the case in the Patent Office.

Signed and sealed this 7th day of May, A. D. 1929.

(Seal)

M. J. Moore,
Acting Commissioner of Patents.